US012614646B2

United States Patent
Akada et al.

(10) Patent No.: US 12,614,646 B2
(45) Date of Patent: Apr. 28, 2026

(54) COPPER-COATED STEEL WIRE, STRANDED WIRE, INSULATED ELECTRIC WIRE, AND CABLE

(71) Applicant: Sumitomo Electric Industries, Ltd., Osaka (JP)

(72) Inventors: Takumi Akada, Osaka (JP); Daigo Sato, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 1084 days.

(21) Appl. No.: 17/616,606

(22) PCT Filed: Jun. 28, 2019

(86) PCT No.: PCT/JP2019/025935
§ 371 (c)(1),
(2) Date: Dec. 3, 2021

(87) PCT Pub. No.: WO2020/261563
PCT Pub. Date: Dec. 30, 2020

(65) Prior Publication Data
US 2022/0230775 A1 Jul. 21, 2022

(51) Int. Cl.
*H01B 3/02* (2006.01)
*C23C 30/00* (2006.01)
*H01B 5/02* (2006.01)

(52) U.S. Cl.
CPC ........... *H01B 3/025* (2013.01); *C23C 30/005* (2013.01); *H01B 5/02* (2013.01)

(58) Field of Classification Search
CPC .......... H01B 3/025; H01B 5/02; C23C 30/005
USPC ........................................................ 428/389
See application file for complete search history.

(56) References Cited

U.S. PATENT DOCUMENTS

2006/0157162 A1* 7/2006 Hirata .................. C22C 38/005 148/331
2008/0314612 A1 12/2008 Takahashi et al.
2016/0340786 A1 11/2016 Mukai et al.
2019/0154096 A1 5/2019 Izumida
(Continued)

FOREIGN PATENT DOCUMENTS

CN 101326593 A 12/2008
CN 103035326 A 4/2013
CN 103418929 A * 12/2013 ......... B23K 35/0266
(Continued)

OTHER PUBLICATIONS

Machine translation of CN103418929A (Year: 2013).*
(Continued)

*Primary Examiner* — Vincent Tatesure
(74) *Attorney, Agent, or Firm* — McCarter & English, LLP; Michael A. Sartori

(57) ABSTRACT

A copper-coated steel wire includes a core wire made of a steel, and a coating layer made of copper or a copper alloy and covering an outer peripheral surface of the core wire. In a cross section perpendicular to a longitudinal direction of the core wire, the core wire includes a plurality of oxide regions composed of an oxide of an element contained in the steel constituting the core wire, the oxide regions including the outer peripheral surface of the core wire and being disposed apart from each other in a circumferential direction of the core wire.

12 Claims, 7 Drawing Sheets

(56) References Cited

U.S. PATENT DOCUMENTS

| | | | |
|---|---|---|---|
| 2019/0272931 | A1 | 9/2019 | Izumida et al. |

FOREIGN PATENT DOCUMENTS

| | | | | | |
|---|---|---|---|---|---|
| CN | 109312435 | A | * | 2/2019 | .............. B21F 35/00 |
| CN | 109791815 | A | | 5/2019 | |
| JP | 59104292 | A | * | 6/1984 | |
| JP | H01-289021 | A | | 11/1989 | |
| JP | 2002-270039 | A | | 9/2002 | |
| JP | 2008-121087 | A | | 5/2008 | |
| JP | 2018037324 | A | * | 3/2018 | |
| WO | 2015/041132 | A1 | | 3/2015 | |
| WO | 2017/212770 | A1 | | 12/2017 | |
| WO | WO-2018233986 | A1 | * | 12/2018 | ............. B21C 1/003 |

OTHER PUBLICATIONS

CN-109312435-A (Year: 2017).*
JP-2018037324-A machine translation (Year: 2018).*
JP-59104292-A machine translation (Year: 1982).*

* cited by examiner

COPPER-COATED STEEL WIRE, STRANDED WIRE, INSULATED ELECTRIC WIRE, AND CABLE

TECHNICAL FIELD

The present disclosure relates to a copper-coated steel wire, a stranded wire, an insulated electric wire, and a cable.

BACKGROUND ART

A copper-coated steel wire, with the surface of a steel material coated with copper, may be adopted in applications where both conductivity and strength are required (see, for example, Patent literatures 1 and 2).

CITATION LIST

Patent Literature

Patent Literature 1: Japanese Patent Application Laid-Open No. 2002-270039

Patent Literature 2: Japanese Patent Application Laid-Open No. H01-289021

SUMMARY OF INVENTION

A copper-coated steel wire according to the present disclosure includes a core wire made of a steel, and a coating layer made of copper or a copper alloy and coveting an outer peripheral surface of the core wire. In a cross section perpendicular to a longitudinal direction of the core wire, the core wire includes a plurality of oxide regions composed of an oxide of an element contained in the steel constituting the core wire, the oxide regions including the outer peripheral surface of the core wire and being disposed apart from each other in a circumferential direction of the core wire.

Description Of Embodiments

Figure 1:
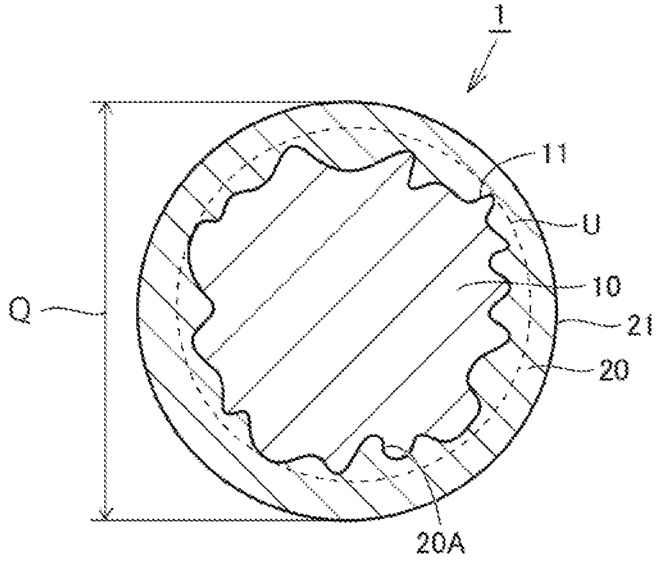
FIG. 1 is a schematic cross-sectional view showing the structure of a copper-coated steel wire in Embodiment 1.

Problems to be Solved by the Present Disclosure

The aforementioned copper-coated steel wire includes a core wire made of a steel and a coating layer made of copper or a copper alloy. Such a copper-coated steel wire can be used as an electric wire. The electric wire is required to be capable of crimping for the purpose of simple connection. However, when copper-coated steel wires are connected to each other or a copper-coated steel wire is connected to a terminal by crimping, the coating layer may peel off from the core wire. In view of the foregoing, one of the objects is to provide a copper-coated steel wire which can suppress the peeling of the coating layer from the core wire when crimping is performed.

Advantageous Effects of the Present Disclosure

According to the copper-coated steel wire of the present disclosure, the coating layer can be suppressed from peeling off from the core wire when crimping is performed.

Description of Embodiments of the Present Disclosure

Firstly, embodiments of the present disclosure will be listed and described. A copper-coated steel wire of the present disclosure includes a core wire made of a steel, and a coating layer made of copper or a copper alloy and covering an outer peripheral surface of the core wire. In a cross section perpendicular to a longitudinal direction of the core wire, the core wire includes a plurality of oxide regions composed of an oxide of an element contained in the steel constituting the core wire, the oxide regions including the outer peripheral surface of the core wire and being disposed apart from each other in a circumferential direction of the core wire.

In the copper-coated steel wire of the present disclosure, the core wire made of a steel assures high strength. The coating layer made of copper or a copper alloy ensures excellent conductivity. The core wire includes a plurality of oxide regions. When the copper-coated steel wire is subjected to crimping, the plurality of oxide regions can be allowed to enter into both the core wire and the coating layer. This makes it difficult for the coating layer to peel off from the core wire, leading to improved adhesion between the core wire and the coating layer. As such, according to the copper-coated steel wire of the present disclosure, the coating layer can be suppressed from peeling off from the core wire when crimping is performed.

In the present disclosure, "circumferential direction of the core wire" refers to, in a cross section perpendicular to the longitudinal direction of the core wire, the circumferential direction of a circle having the smallest area among the circles that are circumscribed to the core wire.

In the copper-coated steel wire described above, in the cross section perpendicular to the longitudinal direction of the core wire, a sum of lengths of the plurality of oxide regions in the circumferential direction of the core wire may be not less than 20% and not more than 80% of a length of the outer peripheral surface of the core wire. Setting the sum of the lengths of the plurality of oxide regions to be 20% or more of the length of the outer peripheral surface of the core wire can suppress the peeling of the coating layer from the core wire. If the sum of the lengths of the plurality of oxide regions exceeds 80% of the length of the outer peripheral surface of the core wire, the area where the steel contacts the copper or the copper alloy becomes small, which may degrade the adhesion between the core wire and the coating layer. It is therefore preferable that the sum of the lengths of the plurality of oxide regions is not more than 80% of the length of the outer peripheral surface of the core wire. It should be noted that "sum of the lengths of the plurality of oxide regions in the circumferential direction of the core wire" refers to the sum of the lengths of all oxide regions in the circumferential direction of the core wire.

In the copper-coated steel wire described above, in the cross section perpendicular to the longitudinal direction of the core wire, the oxide region may have a thickness of not less than 0.02% and not more than 2% of a wire diameter of the copper-coated steel wire. Setting the thickness of the oxide region to be 0.02% or more of the wire diameter of the copper-coated steel wire can suppress the peeling of the coating layer from the core wire. If the thickness of the oxide region exceeds 2% of the wire diameter of the copper-coated steel wire, the coating layer may peel off from the core wire. It is therefore preferable that the thickness of the oxide region is not more than 2% of the wire diameter of the copper-coated steel wire. It should be noted that the above-described "thickness of the oxide region in the cross section perpendicular to the longitudinal direction of the core wire" refers to the average of the thicknesses of all oxide regions in the cross section perpendicular to the longitudinal direction of the core wire.

In the copper-coated steel wire described above, in the cross section perpendicular to the longitudinal direction of the core wire, a ratio of a length of the oxide region in the circumferential direction of the core wire to a thickness of the oxide region may be not less than 1 and not more than 30. Setting the ratio of the length of the oxide region in the circumferential direction of the core wire to the thickness of the oxide region to be at least 1 can more reliably suppress the peeling of the coating layer from the core wire. If the above ratio exceeds 30, it may become difficult for the oxide regions to enter into both the core wire and the coating layer. It is therefore preferable that the above ratio is not more than 30. It should be noted that the above-described "length of the oxide region in the circumferential direction of the core wire" refers to the average of the lengths of all oxide regions in the circumferential direction of the core wire.

In the copper-coated steel wire described above, the copper or the copper alloy constituting the coating layer may have an average grain size of not less than 1 μm and not more than 5 μm. Setting the average grain size of the copper or the copper alloy within the above range facilitates deformation of the coating layer when the copper-coated steel wire is subjected to crimping.

In the copper-coated steel wire described above, with respect to a total sum of lengths of grain boundaries of all crystals of the copper or the copper alloy constituting the coating layer, a ratio of a total sum of lengths of grain boundaries in first twins having a (111) plane as a twinning plane and a <111> direction as a twinning direction may be 50% or more, and a ratio of a value obtained by adding together a total sum of lengths of grain boundaries in second twins having a (110) plane as the twinning plane and a <110> direction as the twinning direction and the total sum of the lengths of the grain boundaries in the first twins may be 65% or more. Having the copper or the copper alloy satisfying the above conditions allows the coating layer to be sufficiently deformed when the copper-coated steel wire is subjected to crimping.

In the copper-coated steel wire described above, the steel constituting the core wire may have a pearlite structure. A steel with a pearlite structure is a suitable material for constituting the above-described core wire.

In the copper-coated steel wire described above, the steel constituting the core wire may have a carbon content of not less than 0.3 mass % and not more than 1.1 mass %. The carbon content greatly affects the strength of the steel. Setting the carbon content within the above range can readily impart an appropriate strength to the core wire.

In the copper-coated steel wire described above, the coating layer may include an intermediate layer disposed in a region including an interface with the core wire and having a higher zinc concentration than a remaining region of the coating layer. The zinc concentration in the intermediate layer may be not less than 45 mass % and not more than 95 mass %. The inclusion of the intermediate layer having a high zinc concentration can further improve the adhesion between the core wire and the coating layer. Setting the zinc concentration in the intermediate layer to be not less than 45 mass % can more reliably improve the adhesion between the core wire and the coating layer. If the zinc concentration in the intermediate layer exceeds 95 mass %, the conductivity of the copper-coated steel wire may be reduced. It is therefore preferable that the zinc concentration in the intermediate layer is not more than 95 mass %.

In the copper-coated steel wire described above, the steel constituting the core wire may be an austenitic stainless steel. The use of an austenitic stainless steel can suppress corrosion of the core wire described above.

In the copper-coated steel wire described above, the coating layer may include an intermediate layer disposed in a region including an interface with the core wire and having a higher nickel concentration than a remaining region of the coating layer. The nickel concentration in the intermediate layer may be not less than 5 mass % and not more than 95 mass %. The inclusion of the intermediate layer having a high nickel concentration can improve the adhesion between the core wire and the coating layer and suppress the peeling of the coating layer from the core wire when crimping is performed. Setting the nickel concentration in the intermediate layer to be not less than 5 mass % can more reliably improve the adhesion between the core wire and the coating layer. If the nickel concentration in the intermediate layer exceeds 95 mass %, the conductivity of the copper-coated steel wire may be reduced. It is therefore preferable that the nickel concentration in the intermediate layer is not more than 95 mass %.

The copper-coated steel wire described above may have a wire diameter of not less than 0.01 mm and not more than 5 mm. This makes it easy to obtain a copper-coated steel wire that is suitable for use particularly as an electric wire. It should be noted that "wire diameter" in the present application means the diameter of the copper-coated steel wire when its cross section perpendicular to the longitudinal direction is circular. When the cross section is not circular, the term means the diameter of a circle having the smallest area among the circles circumscribed to the cross section.

A stranded wire of the present disclosure is composed of a plurality of the above-described copper-coated steel wires twisted together. According to the stranded wire of the present disclosure, with it having the structure of the above-described copper-coated steel wires twisted together, the coating layer can be suppressed from peeling off from the core wire when crimping is performed.

An insulated electric wire of the present disclosure includes: the above-described copper-coated steel wire or the above-described stranded wire; and an insulating layer disposed to cover an outer periphery of the copper-coated steel wire or the stranded wire. According to the insulated electric wire of the present disclosure, with it including the above-described copper-coated steel wire or the above-described stranded wire, the coating layer can be suppressed from peeling off from the core wire when crimping is performed.

A cable of the present disclosure includes: the above-described copper-coated steel wire or the above-described stranded wire; an insulating layer disposed to cover an outer periphery of the copper-coated steel wire or the stranded wire; and a shielding portion disposed to surround an outer peripheral surface of the insulating layer. According to the cable of the present disclosure, with it having the structure including the above-described copper-coated steel wire or the above-described stranded wire, the coating layer can be suppressed from peeling off from the core wire when crimping is performed.

Details of Embodiments of the Present Disclosure

Embodiments of a copper-coated steel wire according to the present disclosure will be described below with reference to the drawings. In the following drawings, the same or corresponding parts are denoted by the same reference numerals, and the descriptions thereof will not be repeated.

Embodiment 1

FIG. 1 is a cross-sectional view of a core wire its cross section perpendicular to the longitudinal direction. Referring to FIG. 1, a copper-coated steel wire 1 in the present embodiment includes a core wire 10 and a coating layer 20. The copper-coated steel wire 1 has a circular cross section perpendicular to the longitudinal direction thereof. The core wire 10 is made of a steel. In the present embodiment, the steel constituting the core wire 10 has a pearlite structure.

The steel constituting the core wire 10 preferably has a carbon content of not less than 0.3 mass % and not more than 1.1 mass %. The steel constituting the core wire 10 may contain not less than 0.5 mass % and not more than 1.0 mass % carbon, not less than 0.1 mass % and not more than 2.5 mass % silicon, and not less than 0.3 mass % and not more than 0.9 mass % manganese, with the balance being iron and unavoidable impurities. The steel constituting the core wire 10 may further contain at least one element selected from the group consisting of not less than 0.1 mass % and not more than 0.4 mass % nickel, not less than 0.1 mass % and not more than 1.8 mass % chromium, not less than 0.1 mass % and not more than 0.4 mass % molybdenum, and not less than 0.05 mass % and not more than 0.3 mass % vanadium. The steel constituting the core wire 10 may have a component composition identical to that of, for example, a piano wire specified in JIS standard, specifically SWP-B.

Figure 2:
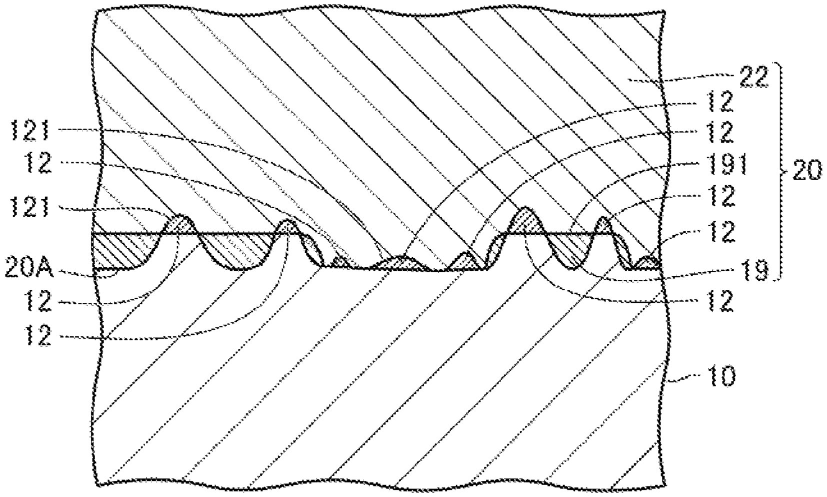
FIG. 2 is an enlarged view of the vicinity of the interface of the coating layer with the core wire in FIG. 1.

Referring to FIGS. 1 and 2, the coating layer 20 covers an outer peripheral surface 11 of the core wire 10. The coating layer 20 includes a copper layer 22 and an intermediate layer 19 (see FIG. 2). The copper layer 22 is disposed so as to include an outer peripheral surface 21 of the coating layer 20. In the present embodiment, the copper layer 22 is made of a copper alloy. In the present embodiment, the copper alloy constituting the copper layer 22 has an average grain size of not less than 1 μm and not more than 5 μm. The average grain size of the copper alloy is preferably not less than 1.2 μm and not more than 2 μm. In the present embodiment, the copper alloy constituting the copper layer 22 satisfies the following conditions. With respect to a total sum of lengths of grain boundaries of all crystals of the copper alloy constituting the copper layer 22, a ratio of a total sum of lengths of grain boundaries in first twins having a (111) plane as a twinning plane and a <111> direction as a twinning direction is 50% or more. The ratio of the total sum of the lengths of the grain boundaries in the first twins is preferably 60% or more and more preferably 70% or more. Further, a ratio of a value obtained by adding together a total sum of lengths of grain boundaries in second twins having a (110) plane as the twinning plane and a <110> direction as the twinning direction and the total sum of the lengths of the grain boundaries in the first twins with respect to the total sum of the lengths of the grain boundaries of all the crystals of the copper alloy is 65% or more. The ratio of the value obtained by adding together the total sum of the lengths of the grain boundaries in the second twins and the total sum of the lengths of the grain boundaries in the first twins is preferably 70% or more and more preferably 80% or more.

The above-described average grain size or length of grain diameter is measured in the following manner. Firstly, a sample is taken from the copper-coated steel wire 1. A cross section of the obtained sample perpendicular to the longitudinal direction is polished. Next, the polished cross section is etched with an appropriate etchant. Then, an electron microscope or the like is used to measure the grain sizes of 100 copper or copper alloy crystals. The average of the measured grain sizes is calculated to thus obtain the average grain size. The lengths of the grain boundaries of the crystals, the lengths of the grain boundaries of the first twins, and the lengths of the grain boundaries of the second twins are measured in the following manner. The cross section polished in the same manner as described above is etched with an etchant. In a range in the cross section that corresponds to 20% of the area of the coating layer 20, the total sum of the lengths of the grain boundaries of all the copper or copper alloy crystals is determined. Further, in the above range, the total sum of the lengths of the grain boundaries of the first twins and the total sum of the lengths of the grain boundaries of the second twins are each determined.

Referring to FIGS. 1 and 2, the coating layer 20 in the copper-coated steel wire 1 in the present embodiment includes an intermediate layer 19 disposed in a region including an interface 20A with the core wire 10. The intermediate layer 19 has a higher zinc concentration than a remaining region of the coating layer 20. In the present embodiment, the zinc concentration in the intermediate layer 19 is not less than 45 mass % and not more than 95 mass %.

Referring to FIG. 2, the core wire 10 includes a plurality of oxide regions 12. The material constituting the oxide regions 12 is an oxide of an element contained in the steel constituting the core wire 10. In the present embodiment, the material constituting the oxide regions 12 is an iron oxide. The plurality of oxide regions 12 are disposed to include the outer peripheral surface 11 of the core wire 10 and to be exposed from the intermediate layer 19. The plurality of oxide regions 12 are disposed so as to enter into the copper layer 22. The plurality of oxide regions 12 are disposed apart from each other in the circumferential direction of the core wire 10. In the present embodiment, the spacing between the oxide regions 12 in the circumferential direction of the core wire 10 is, for example, 0.1 μm or more.

In the present embodiment, in the cross section perpendicular to the longitudinal direction of the core wire 10, the sum of lengths of the plurality of oxide regions 12 in the circumferential direction of the core wire 10 is not less than 20% and not more than 80% of the length of the outer peripheral surface 11 of the core wire 10. The sum of the lengths of the plurality of oxide regions 12 is preferably not less than 20% and not more than 70%. In the present embodiment, in the cross section perpendicular to the longitudinal direction of the core wire 10, the oxide region 12 has a thickness of not less than 0.02% and not more than 2% of the wire diameter Q (see FIG. 1) of the copper-coated steel wire. The thickness of the oxide region 12 is preferably not less than 0.05% and not more than 1.2%. In the cross section perpendicular to the longitudinal direction of the core wire 10, the ratio of the length of the oxide region 12 in the circumferential direction of the core wire 10 to the thickness of the oxide region 12 is not less than 1 and not more than 30. The ratio of the length of the oxide region 12 in the circumferential direction of the core wire 10 is preferably not less than 10 and not more than 25. The length of the oxide region 12 described above is measured, for example, as follows. Firstly, a sample is taken from the copper-coated steel wire 1. Next, a cross section of the obtained sample perpendicular to the longitudinal direction is polished. Then, an optical microscope or the like is used to measure, on the polished surface, the length of the oxide region 12 in the circumferential direction of the core wire 10. The thickness of the oxide region 12 is measured similarly, using the optical microscope or the like.

Figure 3:
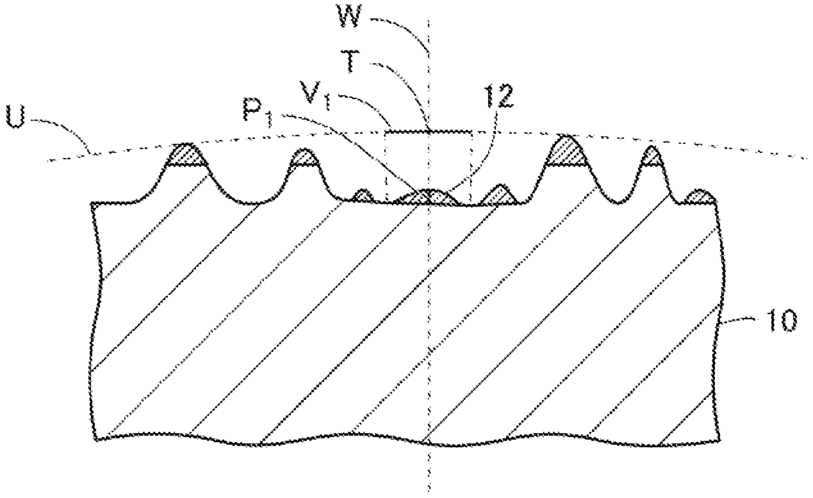
FIG. 3 shows only the core wire in FIG. 2.

Now, the methods of determining the above-described "sum of lengths of the plurality of oxide regions 12 in the circumferential direction of the core wire 10", "thickness of the oxide region 12", and "length of the oxide region 12" will be specifically described with reference to FIGS. 1 and 3. FIG. 3 is a cross-sectional view of the core wire 10 in its cross section perpendicular to the longitudinal direction. Referring to FIG. 1, the circumferential direction of the core wire 10 is, in a cross section perpendicular to the longitudinal direction of the core wire 10, the direction along a circle U having the smallest area among the circles circumscribed to the core wire 10. Referring to FIG. 3, a length $V_1$ of an oxide region 12 in the circumferential direction of the core wire 10 is the length of the oxide region 12 when the oxide region 12 is projected radially onto the circle U. A thickness $P_1$ of the oxide region 12 is the length of an orthographic projection of the oxide region 12 onto a straight line W that passes the midpoint T in the projection image of the oxide region 12 projected radially onto the circle U and extends along the radial direction of the circle U. The sum of the lengths of all the oxide regions 12 obtained in this manner is the "sum of the lengths of the plurality of oxide regions 12 in the circumferential direction of the core wire 10". The average of the thicknesses of all the oxide regions obtained in this manner is the "thickness of the oxide region 12". Further, the average of the lengths of all the oxide regions obtained in this manner is the "length of the oxide region 12".

A description will now be made of an exemplary method of producing the copper-coated steel wire 1 of the present embodiment. FIGS. 5 to 9 are enlarged views of the vicinity of an outer peripheral surface of a material steel wire in a cross section perpendicular to the longitudinal direction of the material steel wire.

Figure 4:
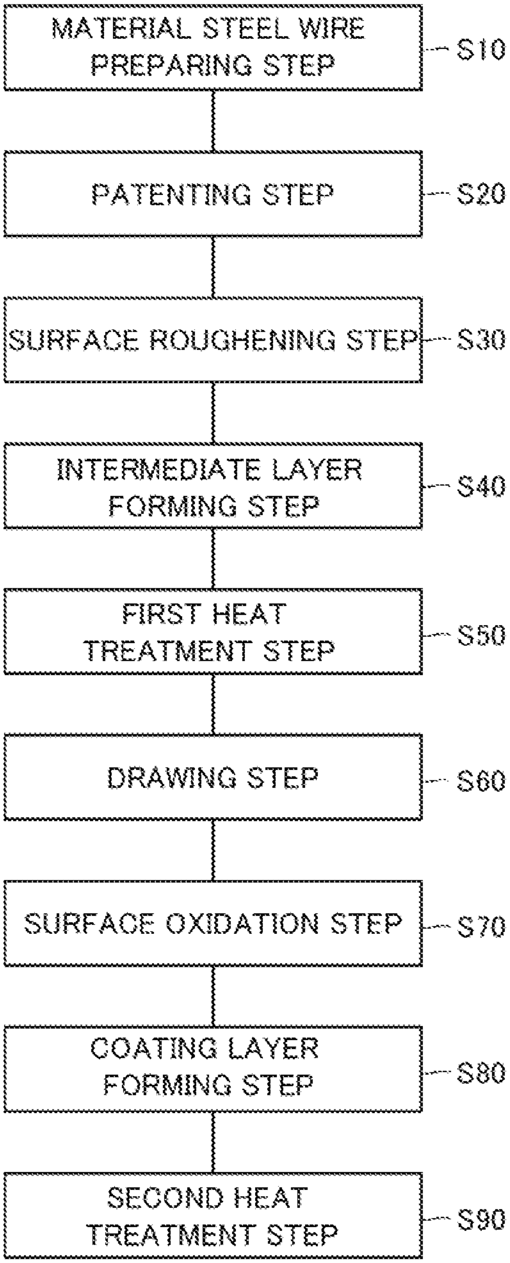
FIG. 4 is a flowchart illustrating an outline of a method of producing a copper-coated steel wire in Embodiment 1.
Figure 5:
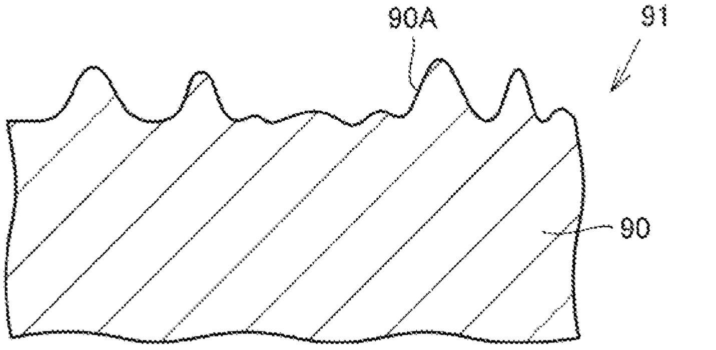
FIG. 5 is a schematic cross-sectional view illustrating the copper-coated steel wire producing method.
Figure 6:
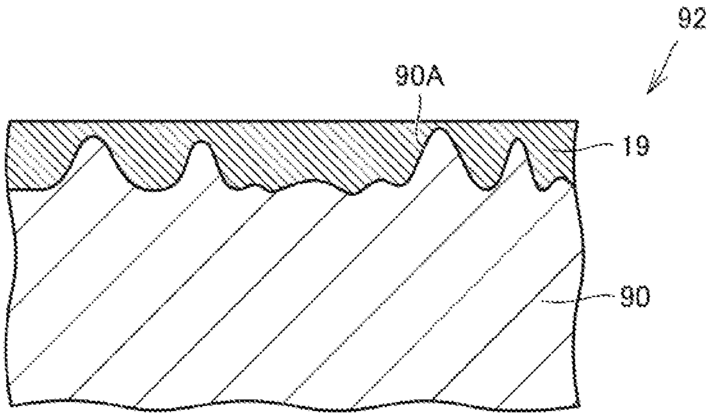
FIG. 6 is a schematic cross-sectional view illustrating the copper-coated steel wire producing method.
Figure 7:
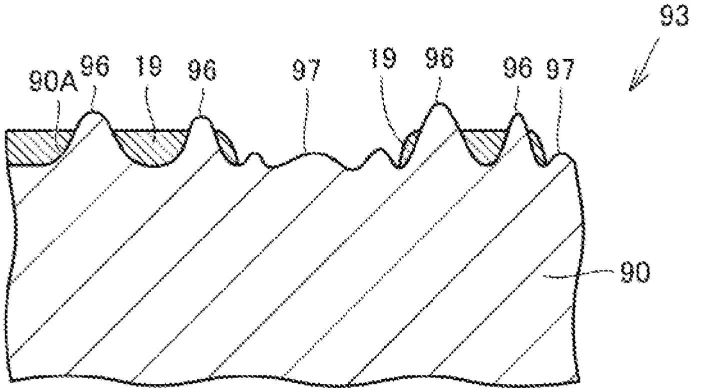
FIG. 7 is a schematic cross-sectional view illustrating the copper-coated steel wire producing method.
Figure 8:
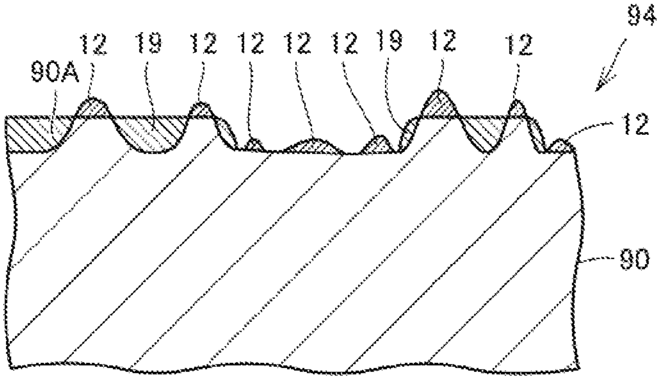
FIG. 8 is a schematic cross-sectional view illustrating the copper-coated steel wire producing method.
Figure 9:
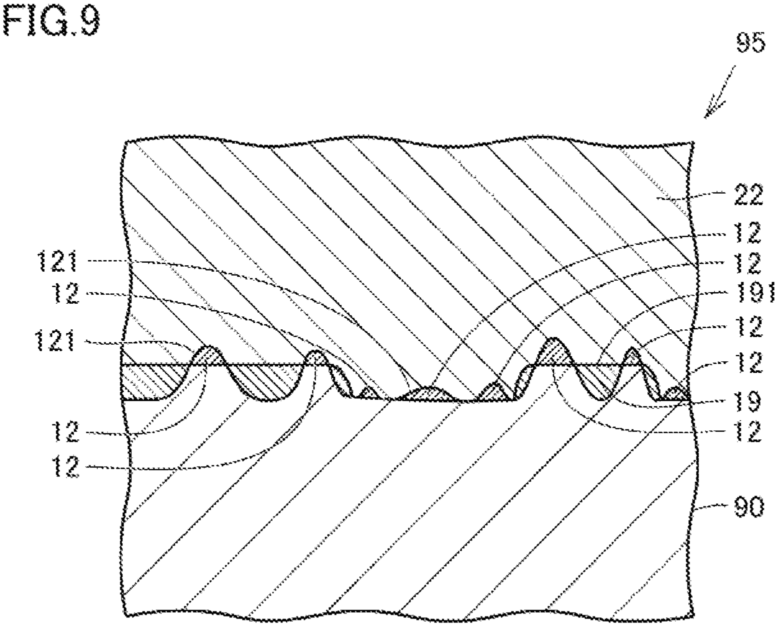
FIG. 9 is a schematic cross-sectional view illustrating the copper-coated steel wire producing method.

Referring to FIG. 4, in the method of producing the copper-coated steel wire 1 of the present embodiment, a material steel wire preparing step is firstly conducted as a step S10. In this step S10, a material steel wire is prepared. Specifically, a material steel wire composed of a steel that contains not less than 0.5 mass % and not more than 1.0 mass % C, not less than 0.1 mass % and not more than 2.5 mass % Si, and not less than 0.3 mass % and not more than 0.9 mass % Mn, with the balance being Fe and unavoidable impurities, is prepared. The steel constituting the material steel wire may further contain at least one element selected from the group consisting of not less than 0.1 mass % and not more than 0.4 mass % Ni, not less than 0.1 mass % and not more than 1.8 mass % Cr, not less than 0.1 mass % and not more than 0.4 mass % Mo, and not less than 0.05 mass % and not more than 0.3 mass % V.

Next, a patenting step is conducted as a step S20. In this step S20, the material steel wire prepared in step S10 is subjected to patenting. Specifically, heat treatment is conducted in which the material steel wire is heated to a temperature range not lower than the austenitizing temperature (A1 point) and then rapidly cooled to a temperature range higher than the MS point and held in the temperature range. With this, the metallic structure of the material steel wire becomes a fine pearlite structure with small lamellar spacing. Here, in the patenting treatment, the process of heating the material steel wire to the temperature range not lower than the A1 point is performed in an inert gas atmosphere from the standpoint of suppressing the occurrence of decarburization.

Next, referring to FIG. 4, a surface roughening step is conducted as a step S30. In this step S30, the material steel wire that has undergone patenting in step S20 is subjected to a surface roughening process. Specifically, referring to FIG. 5, the material steel wire 90 has its outer peripheral surface 90A brought into contact with an acid such as hydrochloric acid or sulfuric acid for increasing the surface roughness. Hydrochloric acid having a concentration of 35%, for example, can be used. The concentration of sulfuric acid can be, for example, 65%. The surface roughening process may include, instead of or in addition to the process of making the surface contact the acid, a process of mechanically achieving the surface roughening by, for example, pressing a polishing non-woven fabric against the outer peripheral surface 90A of the material steel wire 90 and moving the fabric relative to the surface. With this step S30 conducted, a first intermediate steel wire 91 is obtained.

Next, referring to FIG. 4, an intermediate layer forming step is conducted as a step S40. In this step S40, referring to FIGS. 5 and 6, a step of forming an intermediate layer 19 on the first intermediate steel wire 91 obtained through the steps up to step S30 is conducted. Specifically, for example, a metallic layer containing copper and zinc, the intermediate layer 19, is formed by plating on the outer peripheral surface 90A of the material steel wire 90. The intermediate layer 19 contains zinc of not less than 45 mass % and not more than 95 mass %, for example, with the balance being copper and unavoidable impurities. The unavoidable impurities are preferably not more than 1 mass %, for example, and preferably not more than 0.5 mass %. With this step S40 conducted, a second intermediate steel wire 92 is obtained. While the case of forming the intermediate layer 19 containing copper and zinc was described in the present embodiment, an intermediate layer 19 containing zinc and no copper may be formed.

Next, referring to FIG. 4, a first heat treatment step is conducted as a step S50. In this step S50, referring to FIG. 6, the second intermediate steel wire 92 obtained through the steps up to step S40 is subjected to heat treatment. Specifically, the second intermediate steel wire 92 is heated to a temperature of not lower than 419.5° C., which is the melting point of zinc. With this, zinc and copper constituting the intermediate layer 19 formed in step S40 become a uniform alloy. The heating temperature in step S50 is preferably not lower than 550° C. The heating temperature in step S50 is preferably not higher than 650° C. The heating time in step S50 can be, for example, not shorter than three seconds and not longer than seven seconds.

Next, referring to FIG. 4, a drawing step is conducted as a step S60. In this step S60, referring to FIGS. 6 and 7, the second intermediate steel wire 92 that has undergone the heat treatment in step S50 is subjected to drawing. At this time, some regions 96, 97 of the material steel wire 90 are exposed from the intermediate layer 19. The degree of working (reduction of area) in the drawing in step S50 may be not less than 90% and not more than 99%, for example. The true strain in the drawing in step S50 is preferably not less than 2.3 and not more than 3.9, for example. Through the above-described procedure, a third intermediate steel wire 93 is obtained.

Next, referring to FIG. 4, a surface oxidation step is conducted as a step S70. In this step S70, referring to FIGS. 7 and 8, the third intermediate steel wire 93 that has undergone the drawing step of step S60 is subjected to the surface oxidation step. Specifically, hydrochloric acid with a concentration of 35 mass % is used for oxidation of some regions 96, 97 of the material steel wire 90, which is followed by water washing. The temperature condition in the surface oxidation step is not lower than 20° C. and not higher than 50° C., for example. In place of hydrochloric acid, an aqueous solution of sulfuric acid with a concentration of 65 mass % or 30 mass % may be used. Water washing may be omitted. With this, the portions exposed from the intermediate layer 19 are oxidized to form oxide regions 12. In this manner, the oxide regions 12 are formed to include the outer peripheral surface 90A of the material steel wire 90 and to be exposed from the intermediate layer 19. Through the above-described procedure, a fourth intermediate steel wire 94 is obtained.

Next, referring to FIG. 4, a coating layer forming step is conducted as a step S80. In this step S80, referring to FIGS. 8 and 9, a copper layer 22 is formed so as to cover a surface 191 of the intermediate layer 19 of the third intermediate steel wire 93 obtained through the steps up to step S60 as well as surfaces 121 of the oxide regions 12 exposed from the intermediate layer 19. The copper layer 22 is formed to contact the surface 191 of the intermediate layer 19 and the surfaces 121 of the oxide regions 12 exposed from the intermediate layer 19. The copper layer 22 can be formed by plating, for example. The copper layer 22 is composed of a copper alloy, for example. Through the above-described procedure, a fifth intermediate steel wire 95 is obtained.

Next, referring to FIG. 4, a second heat treatment step is conducted as a step S90. In this step S90, referring to FIGS. 2 and 9, the fifth intermediate steel wire 95 obtained through the steps up to step S80 is subjected to heat treatment. Specifically, the third intermediate steel wire 93 is heated to a temperature of not lower than a copper recrystallization temperature. The heating temperature in step S80 is preferably not lower than 100° C. The heating temperature in step S80 is preferably not higher than 400° C. The heating time in step S90 may be, for example, not shorter than five minutes and not longer than three hours. With this, the copper constituting the copper layer 22 is recrystallized. Further, the intermediate layer 19 and the copper layer 22 are integrated to form the coating layer 20. The material steel wire 90 becomes the core wire 10. Although the zinc contained in the intermediate layer 19 diffuses into the copper layer 22 at this time, the intermediate layer 19 having a higher zinc concentration than the remaining region is formed in the coating layer 20. In the above-described manner, the copper-coated steel wire 1 in the present embodiment is produced.

Here, the copper-coated steel wire 1 in the present embodiment includes a plurality of oxide regions 12. This allows the plurality of oxide regions 12 to enter into both the core wire 10 and the copper layer 22 when the copper-coated steel wire 1 is subjected to crimping. As a result, it becomes difficult for the coating layer 20 to peel off from the core wire 10, leading to improved adhesion between the core wire 10 and the coating layer 20. As such, according to the copper-coated steel wire 1 in the present embodiment, the coating layer 20 can be suppressed from peeling off from the core wire 10 when crimping is performed.

In the above-described embodiment, in a cross section perpendicular to the longitudinal direction of the core wire 10, the sum of the lengths of the plurality of oxide regions 12 in the circumferential direction of the core wire 10 may be not less than 20% and not more than 80% of the length of the outer peripheral surface 11 of the core wire 10. Setting the sum of the lengths of the plurality of oxide regions 12 to be 20% or more of the length of the outer peripheral surface 11 of the core wire 10 can more reliably improve the adhesion between the core wire 10 and the coating layer 20. If the sum of the lengths of the plurality of oxide regions 12 exceeds 80% of the length of the outer peripheral surface 11 of the core wire 10, the area where the steel contacts the copper alloy becomes small, which may degrade the adhesion between the core wire 10 and the coating layer 20. It is therefore preferable that the sum of the lengths of the plurality of oxide regions 12 is not more than 80% of the length of the outer peripheral surface 11 of the core wire 10.

In the above-described embodiment, in the cross section perpendicular to the longitudinal direction of the core wire 10, the oxide region 12 has a thickness of not less than 0.02% and not more than 2% of the wire diameter Q of the copper-coated steel wire 1. Setting the thickness of the oxide region 12 to be 0.02% or more of the wire diameter Q of the copper-coated steel wire 1 can more reliably improve the adhesion between the core wire 10 and the coating layer 20. If the thickness of the oxide region 12 exceeds 2% of the wire diameter Q of the copper-coated steel wire 1, the coating layer 20 may peel off from the core wire 10. It is therefore preferable that the thickness of the oxide region 12 is not more than 2% of the wire diameter Q of the copper-coated steel wire 1.

In the above-described embodiment, in the cross section perpendicular to the longitudinal direction of the core wire 10, the ratio of the length of the oxide region 12 in the circumferential direction of the core wire 10 to the thickness of the oxide region 112 is not less than 1 and not more than 30. Setting the ratio of the length of the oxide region 12 in the circumferential direction of the core wire 10 to the thickness of the oxide region 12 to be at least 1 can more reliably improve the adhesion between the core wire 10 and the coating layer 20. If the above ratio exceeds 30, it may become difficult for the oxide regions 12 to enter into both the core wire 10 and the coating layer 20. It is therefore preferable that the above ratio is not more than 30.

While the description was made in the above embodiment of the case where the coating layer 20 is made of a copper alloy, not limited thereto, the coating layer 20 may be made of copper.

In the above-described embodiment, the copper alloy constituting the coating layer 20 has an average grain size of not less than 1 μm and not more than 5 μm. Setting the average grain size within the above range facilitates deformation of the coating layer 20 when the copper-coated steel wire 1 is subjected to crimping.

In the above-described embodiment, with respect to the total sum of lengths of grain boundaries of all crystals of the copper alloy constituting the coating layer 20, the ratio of the total sum of lengths of grain boundaries in first twins having a (111) plane as a twinning plane and a <111> direction as a twinning direction is 50% or more, and the ratio of a value obtained by adding together the total sum of lengths of grain boundaries in second twins having a (110) plane as the twinning plane and a <110> direction as the twinning direction and the total sum of the lengths of the grain boundaries in the first twins is 65% or more. Having the copper alloy satisfying the above conditions allows the coating layer to be sufficiently deformed when the copper-coated steel wire 1 is subjected to crimping.

In the above-described embodiment, the steel constituting the core wire 10 has a carbon content of not less than 0.3 mass % and not more than 1.1 mass %. The carbon content greatly affects the strength of the steel. Setting the carbon content within the above range can readily impart an appropriate strength to the core wire 10.

While the description was made in the above embodiment of the case Where the coating layer 20 includes an intermediate layer 19, the configuration is not limited thereto; the intermediate layer 19 may be omitted.

In the above-described embodiment, the coating layer 20 includes the intermediate layer 19 disposed in a region including the interface 20A with the core wire 10 and having a higher zinc concentration than the remaining region of the coating layer 20. The zinc concentration in the intermediate layer 19 is not less than 45 mass % and not more than 95 mass %. The zinc concentration is preferably not less than 35 mass % and not more than 80 mass %. The inclusion of the intermediate layer 19 having a high zinc concentration can further improve the adhesion between the core wire 10 and the coating layer 20. Setting the zinc concentration in the intermediate layer 19 to be not less than 45 mass % can more reliably improve the adhesion between the core wire 10 and the coating layer 20. If the zinc concentration in the intermediate layer 19 exceeds 95 mass %, the conductivity of the copper-coated steel wire 1 may be reduced. It is therefore preferable that the zinc concentration in the intermediate layer 19 is not more than 95 mass %.

While the description was made in the above embodiment of the case where the steel constituting the core wire 10 has a pearlite structure, not limited thereto, the steel may be an austenitic stainless steel. The use of an austenitic stainless steel can suppress corrosion of the core wire 10. In such a case, the coating layer 20 may include an intermediate layer 19 disposed in a region including the interface 20A with the core wire 10 and having a higher nickel concentration than the remaining region of the coating layer 20. The nickel concentration in the intermediate layer 19 may be not less than 5 mass % and not more than 95 mass %. The nickel concentration is preferably not less than 20 mass % and not more than 80 mass %. The inclusion of the intermediate layer 19 having a high nickel concentration can improve the adhesion between the core wire 10 and the coating layer 20 and suppress the peeling of the coating layer 20 from the core wire 10 when crimping is performed.

The copper-coated steel wire 1 of the above embodiment preferably has a tensile strength of not less than 950 MPa and not more than 3000 MPa. With the tensile strength set to be 950 MPa or more, sufficient strength for the copper-coated steel wire 1 can be obtained. With the tensile strength set to be 3000 MPa or less, sufficient toughness can be ensured. The tensile strength is measured, for example, in accordance with JIS Z 2241.

The copper-coated steel wire 1 of the above embodiment preferably has an electrical conductivity of not less than 20% IACS and not more than 80% IACS. This ensures sufficient conductivity in various applications.

The copper-coated steel wire 1 of the above embodiment preferably has a wire diameter Q of not less than 0.01 mm and not more than 5 mm. The wire diameter Q is more preferably not less than 0.01 mm and not more than 1 mm. This makes it easy to obtain a copper-coated steel wire 1 that is suitable for use particularly as an electric wire.

Figure 10:
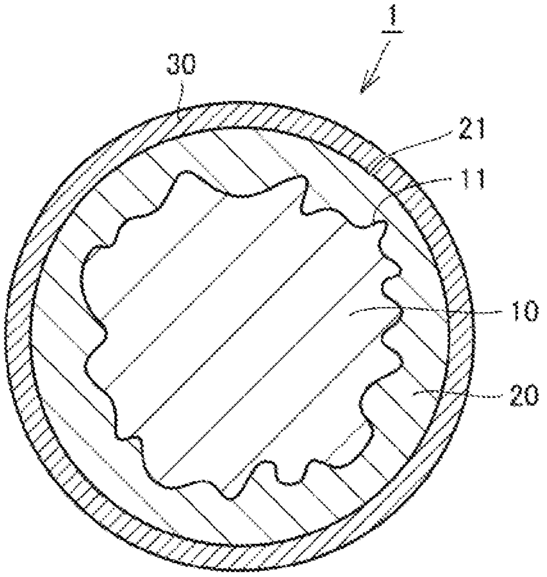
FIG. 10 is a schematic cross-sectional view showing a modification of the copper-coated steel wire in Embodiment 1.

Now, a modification of the copper-coated steel wire 1 in Embodiment 1 will be described. Referring to FIG. 10, the copper-coated steel wire 1 includes a surface layer 30 disposed to include the surface of the copper-coated steel wire 1. The material constituting the surface layer 30 is at least one metal selected from the group consisting of gold, silver, tin, palladium, and nickel. Although the presence of the surface layer 30 is not essential in the copper-coated steel wire of the present application, such a surface layer 30 may be formed for the purposes of improving the wear resistance or reducing the contact resistance when the copper-coated steel wire 1 is connected to a terminal.

Embodiment 2

Figure 11:
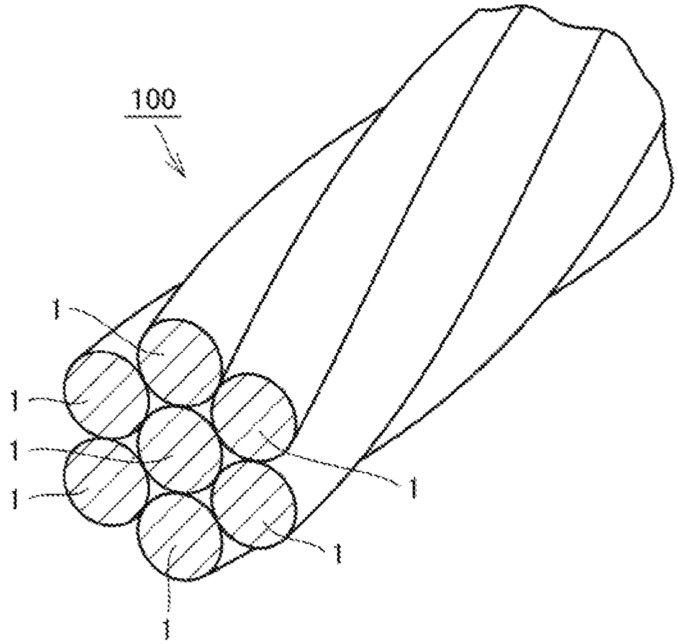
FIG. 11 is a perspective view showing the structure of a stranded wire in Embodiment 2.

A description will now be made, as Embodiment 2, of an embodiment of a stranded wire of the present disclosure. In FIG. 11, cross sections of copper-coated steel wires 1 perpendicular to the longitudinal direction are illustrated as well. Referring to FIG. 11, a stranded wire 100 in the present embodiment is composed of a plurality of the copper-coated steel wires 1 of the above-described Embodiment 1 twisted together. In the present embodiment, the stranded wire has a structure in which seven copper-coated steel wires 1 are twisted together. Each copper-coated steel wire 1 included in the stranded wire 100 is the copper-coated steel wire of the above-described Embodiment 1. With the stranded wire 100 in the present embodiment having the structure in which the copper-coated steel wires 1 of the above-described Embodiment 1 are twisted together, the coating layer 20 can be suppressed from peeling off from the core wire 10 when crimping is performed.

Embodiment 3

Figure 12:
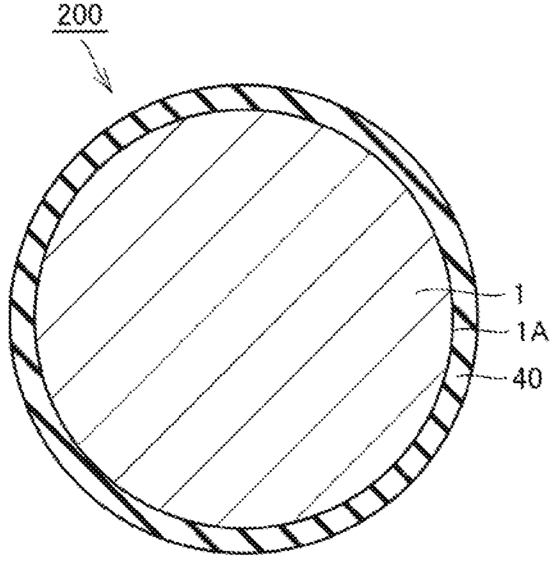
FIG. 12 is a schematic cross-sectional view showing the structure of an insulated electric wire in Embodiment 3.

A description will now be made, as Embodiment 3, of an embodiment of an insulated electric wire of the present disclosure. FIG. 12 is a cross-sectional view of a copper-coated steel wire 1 in its cross section perpendicular to the longitudinal direction. Referring to FIG. 12, an insulated electric wire 200 in the present embodiment includes the copper-coated steel wire 1 of Embodiment 1 described above, and an insulating layer 40 disposed to cover an outer periphery 1A of the copper-coated steel wire 1. The insulated electric wire 200 in the present embodiment is subjected to crimping with the insulating layer 40 partially removed. According to the insulated electric wire 200 of the present disclosure, with it including the copper-coated steel wire 1 of the above-described Embodiment 1, the coating layer 20 can be suppressed from peeling off from the core wire 10 when the crimping as described above is performed. While the case of using the copper-coated steel wire 1 was described in the present embodiment, the wire is not limited thereto the stranded wire 100 of Embodiment 2 may be used in place of the copper-coated steel wire 1.

Embodiment 4

Figure 13:
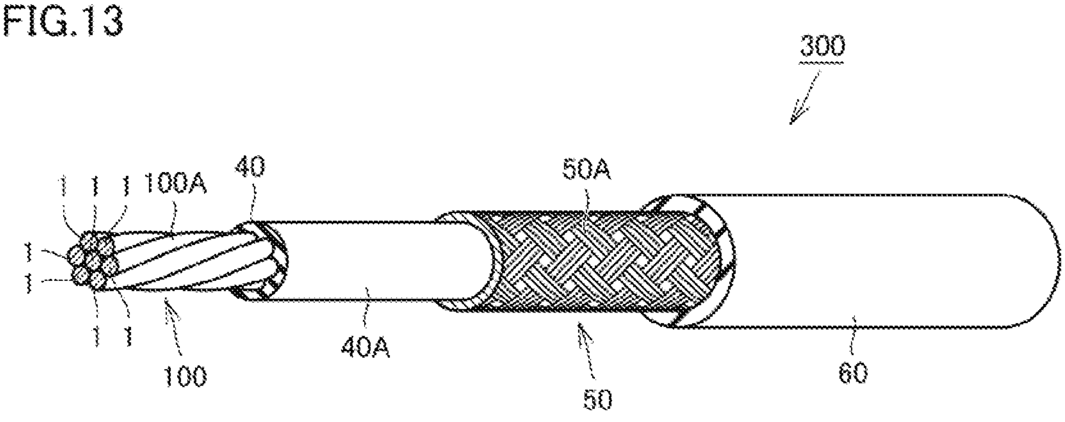
FIG. 13 is a perspective view showing the structure of a cable in Embodiment 4.

A description will now be made, as Embodiment 4, of an embodiment of a cable of the present disclosure. In FIG. 13, cross sections of stranded wire 100, insulating layer, shielding portion, and protective layer perpendicular to the longitudinal direction are illustrated as well. Referring to FIG. 13, a cable 300 includes the stranded wire 100 of Embodiment 2, an insulating layer 40 disposed to cover an outer periphery 100A of the stranded wire 100, a shielding portion 50 disposed to surround an outer peripheral surface 40A of the insulating layer 40, and a protective layer 60 disposed to cover an outer periphery 50A of the shielding portion 50. The cable 300 in the present embodiment is subjected to crimping with the protective layer 60, the shielding portion 50, and the insulating layer 40 partially removed. According to the cable 300 of the present disclosure, with it having the structure including the stranded wire 100, the coating layer 20 can be suppressed from peeling off from the core wire 10 when the crimping as described above is performed. Although the case of using the stranded wire 100 was described in the present embodiment, not limited thereto, the copper-coated steel wire 1 in Embodiment 1 may be used in place of the stranded wire 100.

EXAMPLES

Experiments were conducted to investigate how the plurality of oxide regions 12 affect the properties of the copper-coated steel wire. Firstly, the steps S10 to S90 of the above embodiment were performed to prepare a sample of the copper-coated steel wire 1. For the steel constituting the material steel wire prepared in step S10, a steel containing 0.82 mass % C, 0.27 mass % Si, and 0.45 mass % Mn, with the balance being iron and unavoidable impurities, was adopted. Analysis of the amounts of elements included as the unavoidable impurities showed that P was contained by 0.011 mass %, S by 0.008 mass %, and Cu by 0.000 mass %. In step S70, a coating layer 20 made of pure copper was formed by plating. In this manner, a sample A was produced. The sample A had a wire diameter of 2 mm. In the sample A, the sum of lengths of the plurality of oxide regions 12 in the circumferential direction of the core wire 10 was 79% of the length of the outer peripheral surface of the core wire 10. In the sample A, the thickness of the oxide region 12 was 1.75% of the wire diameter Q of the copper-coated steel wire 1. The ratio of the length of the oxide region 12 in the circumferential direction of the core wire 10 to the thickness of the oxide region 12 was 28.

Samples B to J were prepared which differed from the sample A in at least one of: the wire diameter; the ratio of the thickness of the oxide region 12; the ratio of the sum of the lengths of the plurality of oxide regions 12 in the circumferential direction of the core wire 10 to the length of the outer peripheral surface of the core wire 10; the ratio of the thickness of the oxide region 12 to the copper-coated steel wire 1; and the ratio of the length of the oxide region 12 in the circumferential direction of the core wire 10 to the thickness of the oxide region 12. For comparison, samples K to M were prepared by omitting the step S70. It should be noted that in Table 1, "Oxide Region Coating Ratio" means the ratio of the sum of the lengths of the plurality of oxide regions 12 in the circumferential direction of the core wire 10 to the length of the outer peripheral surface of the core wire 10. "Oxide Region Thickness Ratio" means the ratio of the thickness of the oxide region 12 to the copper-coated steel wire 1. "Ratio of Oxide Region Length to Oxide Region Thickness" means the ratio of the length of the oxide region 12 in the circumferential direction of the core wire 10 to the thickness of the oxide region 12.

Next, for the samples A to M, minimum R/d, tensile strength, and tensile strength after crimping were measured. The minimum R/d is an index for evaluating to what radius of curvature the copper-coated steel wire 1 can be bent without causing separation between the core wire 10 and the coating layer 20. The minimum R/d, obtained by dividing the radius of curvature, R, of the copper-coated steel wire 1 at the time of occurrence of separation between the core wire 10 and the coating layer 20 by the radius d of the copper-coated steel wire 1, was used to evaluate the durability of the copper-coated steel wire against bending. The tensile strength after crimping was evaluated by conducting a tensile test after crimping the copper-coated steel wire 1 using a crimp terminal that applied a for to the copper-coated steel wire in the radially compressing direction. The experimental results are shown in Table 1, together with the wire diameter and other experimental conditions.

TABLE 1

| | Wire Diameter (mm) | Oxide Region Coating Ratio (%) | Oxide Region Thickness Ratio (%) | Ratio of Oxide Region Length to Oxide Region Thickness | Minimum R/d | Tensile Strength (MPa) | Tensile Strength after Crimping (MPa) |
|---|---|---|---|---|---|---|---|
| Sample A | 2 | 79 | 1.75 | 28 | <0.1 | 1380 | 1100 |
| Sample B | 1.78 | 28 | 0.05 | 24 | <0.1 | 1450 | 1300 |
| Sample C | 1.55 | 68 | 1.2 | 14 | <0.1 | 1255 | 1100 |
| Sample D | 1.36 | 55 | 0.8 | 21 | <0.1 | 1360 | 1180 |
| Sample E | 1.23 | 44 | 0.1 | 6 | <0.1 | 1280 | 1115 |
| Sample F | 1 | 72 | 1.25 | 2 | <0.1 | 1535 | 1260 |
| Sample G | 0.88 | 53 | 0.55 | 4 | <0.1 | 1550 | 1285 |
| Sample H | 0.75 | 41 | 0.25 | 16 | <0.1 | 1440 | 1210 |
| Sample I | 0.5 | 22 | 0.07 | 12 | <0.1 | 1465 | 1335 |
| Sample J | 0.25 | 30 | 0.15 | 11 | <0.1 | 1610 | 1430 |
| Sample K | 1.55 | — | — | — | 1.75 | 1250 | 920 |
| Sample L | 1 | — | — | — | 2.5 | 1500 | 1035 |
| Sample M | 0.5 | — | — | — | 0.75 | 1455 | 1020 |

Referring to Table 1, as to the minimum R/d, the samples A to J having the oxide regions 12 formed therein clearly surpass the samples K to M having no oxide regions 12. As to the tensile strength, the samples A to J have tensile strength comparable to those of the samples K to M. As to the tensile strength after crimping, however, the samples A to J clearly surpass the samples K to M. This is conceivably because the presence of the oxide regions 12 has made it difficult for the coating layer 20 to peel off from the core wire 10, resulting in improved adhesion between the core wire 10 and the coating layer 20. Further, in the samples A to J, the ratio of the thickness of the oxide region 12 is not less than 20% and not more than 80%. Similarly, in the samples A to J, the ratio of the sum of the lengths of the plurality of oxide regions 12 in the circumferential direction of the core wire 10 to the length of the outer peripheral surface of the core wire 10 is not less than 0.02% and not more than 2%. Similarly, in the samples A to J, the ratio of the length of the oxide region 12 in the circumferential direction of the core wire 10 to the thickness of the oxide region 12 is not less than 1 and not more than 30. Accordingly, it is preferable that the copper-coated steel wire 1 satisfies the above-described conditions.

The above experimental results demonstrate that the copper-coated steel wire 1 of the present disclosure can provide a copper-coated steel wire that can suppress the peeling of the coating layer 20 from the care wire 10 when crimping is performed.

It should be understood that the embodiments and examples disclosed herein are illustrative and non-restrictive in every respect. The scope of the present disclosure is defined by the terms of the claims, rather than the description above, and is intended to include any modifications within the scope and meaning equivalent to the terms of the claims.

DESCRIPTION OF REFERENCE NUMERALS

1: copper-coated steel wire; 1A, 50A, 100A: outer periphery; 10: core wire; 11, 21, 40A, 90A: outer peripheral surface; 12: oxide region; 19: intermediate layer; 20: coating layer; 20A: interface; 22: copper layer; 30: surface layer; 40: insulating layer; 50: shielding portion; 60: protective layer; 90: material steel wire; 91: first intermediate steel wire; 92: second intermediate steel wire; 93: third intermediate steel wire; 94: fourth intermediate steel wire; 95: fifth intermediate steel wire; 96, 97: region; 100: stranded wire; 121, 191: surface; 200: insulated electric wire; 300: cable; $P_1$: thickness; $V_1$: length; length; Q: wire diameter; T: midpoint; U: circle; and W: straight line.

The invention claimed is:

1. A copper-coated steel wire comprising:

a core wire made of a steel; and a coating layer made of copper or a copper alloy and covering an outer peripheral surface of the core wire;

in a cross section perpendicular to a longitudinal direction of the core wire, the core wire including a plurality of oxide regions composed of an iron oxide, the oxide regions including the outer peripheral surface of the core wire and being disposed apart from each other in a circumferential direction of the core wire, wherein:

the steel constituting the core wire has a pearlite structure, the coating layer includes an intermediate layer disposed in a region including an interface with the core wire and having a higher zinc concentration than a remaining region of the coating layer, and the zinc concentration in the intermediate layer is not less than 45 mass % and not more than 95 mass %.

2. The copper-coated steel wire according to claim 1, wherein in the cross section perpendicular to the longitudinal direction of the core wire, a sum of lengths of the plurality of oxide regions in the circumferential direction of the core wire is not less than 20% and not more than 80% of a length of the outer peripheral surface of the core wire.

3. The copper-coated steel wire according to claim 1, wherein in the cross section perpendicular to the longitudinal direction of the core wire, the oxide region has a thickness of not less than 0.02% and not more than 2% of a wire diameter of the copper-coated steel wire.

4. The copper-coated steel wire according to claim 1, wherein in the cross section perpendicular to the longitudinal direction of the core wire, a ratio of a length of the oxide region in the circumferential direction of the core wire to a thickness of the oxide region is not less than 1 and not more than 30.

5. The copper-coated steel wire according to claim 1, wherein the copper or the copper alloy constituting the coating layer has an average grain size of not less than 1 μm and not more than 5 μm.

6. The copper-coated steel wire according to claim 1, wherein with respect to a total sum of lengths of grain boundaries of all crystals of the copper or the copper alloy constituting the coating layer, a ratio of a total sum of lengths of grain boundaries in first twins having a (111) plane as a twinning plane and a <111> direction as a twinning direction is 50% or more, and a ratio of a value obtained by adding together a total sum of lengths of grain boundaries in second twins having a (110) plane as the twinning plane and a <110> direction as the twinning direction and the total sum of the lengths of the grain boundaries in the first twins is 65% or more.

7. The copper-coated steel wire according to claim 1, wherein the steel constituting the core wire has a carbon content of not less than 0.3 mass % and not more than 1.1 mass %.

8. The copper-coated steel wire according to claim 1, having a wire diameter of not less than 0.01 mm and not more than 5 mm.

9. A stranded wire comprising a plurality of the copper-coated steel wires according to claim 1 twisted together.

10. An insulated electric wire comprising:

the copper-coated steel wire according to claim 1; and an insulating layer disposed to cover an outer periphery of the copper-coated steel wire.

11. An insulated electric wire comprising:

the stranded wire according to claim 9; and an insulating layer disposed to cover an outer periphery of the stranded wire.

12. A copper-coated steel wire comprising:

a core wire made of a steel; and a coating layer made of copper or a copper alloy and covering an outer peripheral surface of the core wire;

in a cross section perpendicular to a longitudinal direction of the core wire, the core wire including a plurality of oxide regions composed of an iron oxide, the oxide regions including the outer peripheral surface of the core wire and being disposed apart from each other in a circumferential direction of the core wire, in the cross section perpendicular to the longitudinal direction of the core wire, a sum of lengths of the plurality of oxide regions in the circumferential direction of the core wire being not less than 20% and not more than 80% of a length of the outer peripheral surface of the core wire, in the cross section perpendicular to the longitudinal direction of the core wire, the oxide region having a thickness of not less than 0.02% and not more than 2% of a wire diameter of the copper-coated steel wire, in the cross section perpendicular to the longitudinal direction of the core wire, a ratio of a length of the oxide region in the circumferential direction of the core wire to a thickness of the oxide region being not less than 1 and not more than 30, the steel constituting the core wire having a pearlite structure, the coating layer including an intermediate layer disposed in a region including an interface with the core wire and having a higher zinc concentration than a remaining region of the coating layer, and the zinc concentration in the intermediate layer being not less than 45 mass % and not more than 95 mass %.

* * * * *